US008331446B2

(12) United States Patent
Schlanger et al.

(10) Patent No.: US 8,331,446 B2
(45) Date of Patent: Dec. 11, 2012

(54) METHOD AND DEVICE FOR REORDERING VIDEO INFORMATION

(75) Inventors: Erik M. Schlanger, Austin, TX (US); Brendan D. Donahe, Lago Vista, TX (US); Eric Swartzendruber, Round Rock, TX (US); Eric J. DeVolder, Cedar Park, TX (US)

(73) Assignee: NetLogic Microsystems, Inc., Irvine, CA (US)

( * ) Notice: Subject to any disclaimer, the term of this patent is extended or adjusted under 35 U.S.C. 154(b) by 1047 days.

(21) Appl. No.: 12/202,293

(22) Filed: Aug. 31, 2008

(65) Prior Publication Data

US 2010/0054339 A1 Mar. 4, 2010

(51) Int. Cl.
H04N 7/12 (2006.01)
H04N 11/02 (2006.01)
H04N 11/04 (2006.01)
G06F 12/02 (2006.01)
G06F 12/06 (2006.01)

(52) U.S. Cl. ......... 375/240.12; 375/240.18; 375/240.25; 375/240.26; 345/565; 345/571; 345/572

(58) Field of Classification Search ............ 375/240.12, 375/240.18, 240.25, 240.26; 345/564, 571, 345/572; 711/101
See application file for complete search history.

(56) References Cited

U.S. PATENT DOCUMENTS

| 5,861,864 | A | 1/1999 | Jensen | |
| 6,212,236 | B1 * | 4/2001 | Nishida et al. | 375/240.12 |
| 6,326,984 | B1 | 12/2001 | Chow et al. | |
| 2001/0021227 | A1 * | 9/2001 | Ngai | 375/240.28 |
| 2004/0028141 | A1 | 2/2004 | Hsiun et al. | |
| 2004/0120403 | A1 * | 6/2004 | Sugahara | 375/240.16 |
| 2006/0170682 | A1 * | 8/2006 | Van Liere | 345/427 |
| 2001/0201559 | | 8/2007 | He | |
| 2007/0253491 | A1 | 11/2007 | Ito et al. | |
| 2008/0063082 | A1 * | 3/2008 | Watanabe et al. | 375/240.23 |
| 2008/0253463 | A1 * | 10/2008 | Lin et al. | 375/240.25 |
| 2008/0317130 | A1 * | 12/2008 | Akiyama et al. | 375/240.16 |
| 2009/0168893 | A1 | 7/2009 | Schlanger et al. | 375/240.24 |
| 2009/0168899 | A1 | 7/2009 | Schlanger et al. | 375/240.26 |
| 2010/0053181 | A1 | 3/2010 | Schlanger et al. | 345/531 |

OTHER PUBLICATIONS

PCT/US2008/087084 International Search Report, Feb. 10, 2009, 4 pages.
U.S. Appl. No. 11/967,690, filed Dec. 31, 2007, entitled "System, Method and Device to Encode and Decode Video Data Having Multiple Video Data Formats,".
U.S. Appl. No. 11/967,697, filed Dec. 31, 2007, entitled "System, Method and Device for Processing Macroblock Video Data,".

* cited by examiner

Primary Examiner — Marsha D. Banks Harold
Assistant Examiner — Jeremy Costin
(74) Attorney, Agent, or Firm — Sterne, Kessler, Goldstein & Fox PLLC

(57) ABSTRACT

A method and device that allow picture slices of a video stream to be processed in an order different than the order they were received is disclosed. Information mapping the location of picture slices that are stored in the order they were received is stored to allow subsequent processing to access the picture slice in any order, including render order.

20 Claims, 9 Drawing Sheets

| MACROBLOCK# | PICTURE SLICE LENGTH | MACROBLOCK SKIP LENGTH | PICTURE SLICE OFFSET |
|---|---|---|---|
| 0 | 0x200 | 9 | 0xc000 |
| 1 | X | X | X |
| 2 | X | X | X |
| 3 | X | X | X |
| 4 | X | X | X |
| 5 | X | X | X |
| 6 | X | X | X |
| 7 | X | X | X |
| 8 | X | X | X |
| 9 | 0x600 | 33 | 0xcb00 |
| 10 | X | X | X |
| ••• | ••• | ••• | ••• |
| 43 | X | X | X |
| 44 | 0x600 | 27 | 0xc400 |
| 45 | X | X | X |
| ••• | ••• | ••• | ••• |
| 72 | 0x200 | 10 | 0xc200 |
| ••• | ••• | ••• | ••• |
| 83 | 0x100 | 4 | 0xca00 |
| ••• | ••• | ••• | ••• |
| 88 | 0x100 | 0 | 0xd400 |
| 89 | 0x100 | 10 | 0xxd500 |
| ••• | ••• | ••• | ••• |
| 100 | 0xd20 | X | 0xd800 |
| ••• | ••• | ••• | ••• |
| 395 | X | X | X |

METHOD AND DEVICE FOR REORDERING VIDEO INFORMATION

FIELD OF THE DISCLOSURE

The present disclosure relates to video processing and more particularly to a device and method of processing video data.

BACKGROUND

Various video encoding standards can process picture data in an order that is different than its raster order. Because a picture that represents a frame of video may be used to process a picture representing a subsequently received frame of video, it needs to be completely processed so that its rendered image is of appropriate quality. If not, its visual deficiencies will be propagated to the subsequently received frames. A method and apparatus for efficiently processing a video picture having picture slices that are received in an order other than render order would be useful.

BRIEF DESCRIPTION OF THE DRAWINGS

Embodiments incorporating teachings of the present disclosure are shown and described with respect to the drawings presented herein, in which:

FIG. 9 illustrates a table representing picture slice mapping information in accordance with a specific embodiment of the present disclosure.

DETAILED DESCRIPTION

A method and device that allow picture slices of a video stream to be processed in an order different than the order they were received is disclosed. Information mapping the location of picture slices that are stored in the order they were received is stored to allow subsequent processing to access the picture slice in any order, including render order. Various embodiments of the present disclosure will be better understood with reference to FIGS. 1-10.

Figure 1:
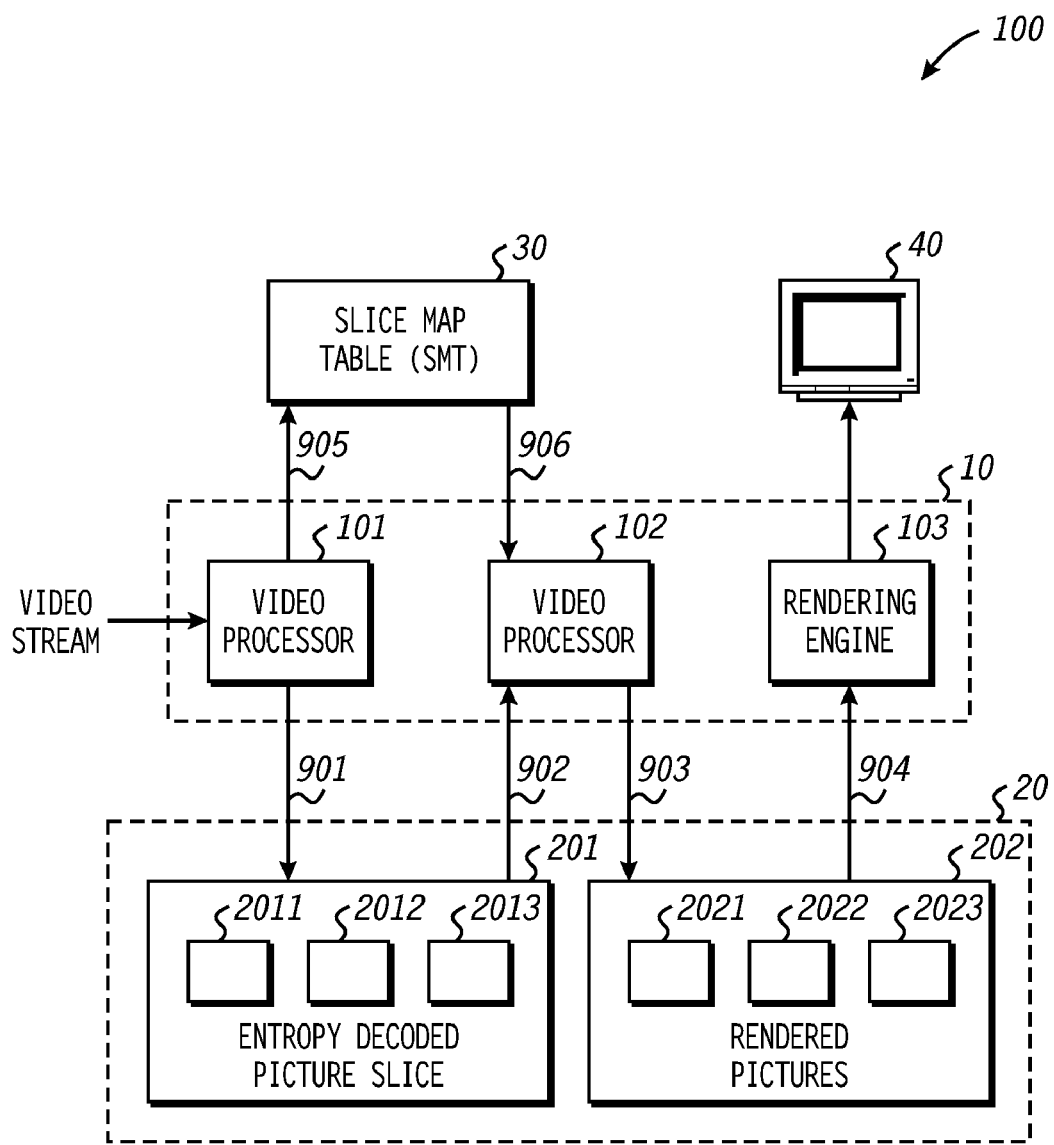
FIG. 1 illustrates a functional block diagram of a particular embodiment of a video processing system in accordance with a specific embodiment of the present disclosure.

FIG. 1 illustrates a system 100 that includes a display device 40, and an image processing module that includes: media processing engine (MPE) 10, memory 20, and slice map table memory 30. MPE 10 includes a plurality of video processor modules, including video processor module 101, video processor module 102, and rendering engine 103. The image processing module of FIG. 1 is configured to store various digital pictures at memory 20, including encoded digital pictures and rendered digital pictures. Memory portion 201 of memory 20 stores encoded digital pictures that are referred to herein as entropy decoded picture slice pictures. Memory portion 202 of memory 20 stores rendered digital pictures.

Video processor 101 includes: an input to receive digital information labeled VIDEO STREAM; an I/O interface connected to interconnects 905 and 906 to access slice map table memory 30; an I/O interface connected to interconnects 901-904 to access memory 20; and an output connected to display device 40. Operation of a device including the video processor of FIG. 1 will be better understood with reference to FIG. 2.

Figure 2:
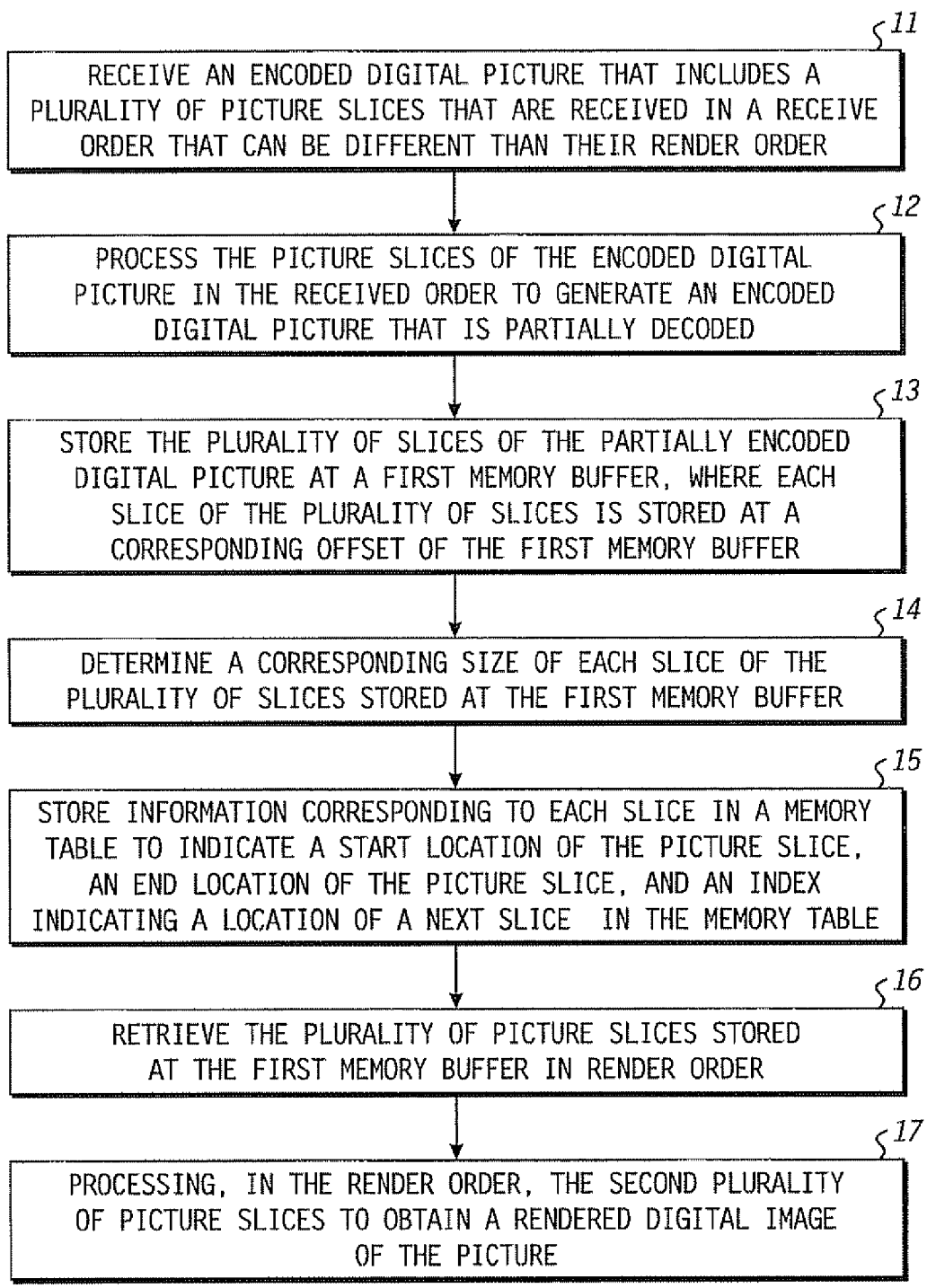
FIG. 2 illustrates a flow diagram representing a method in accordance with a specific embodiment of the present disclosure.
Figure 3:
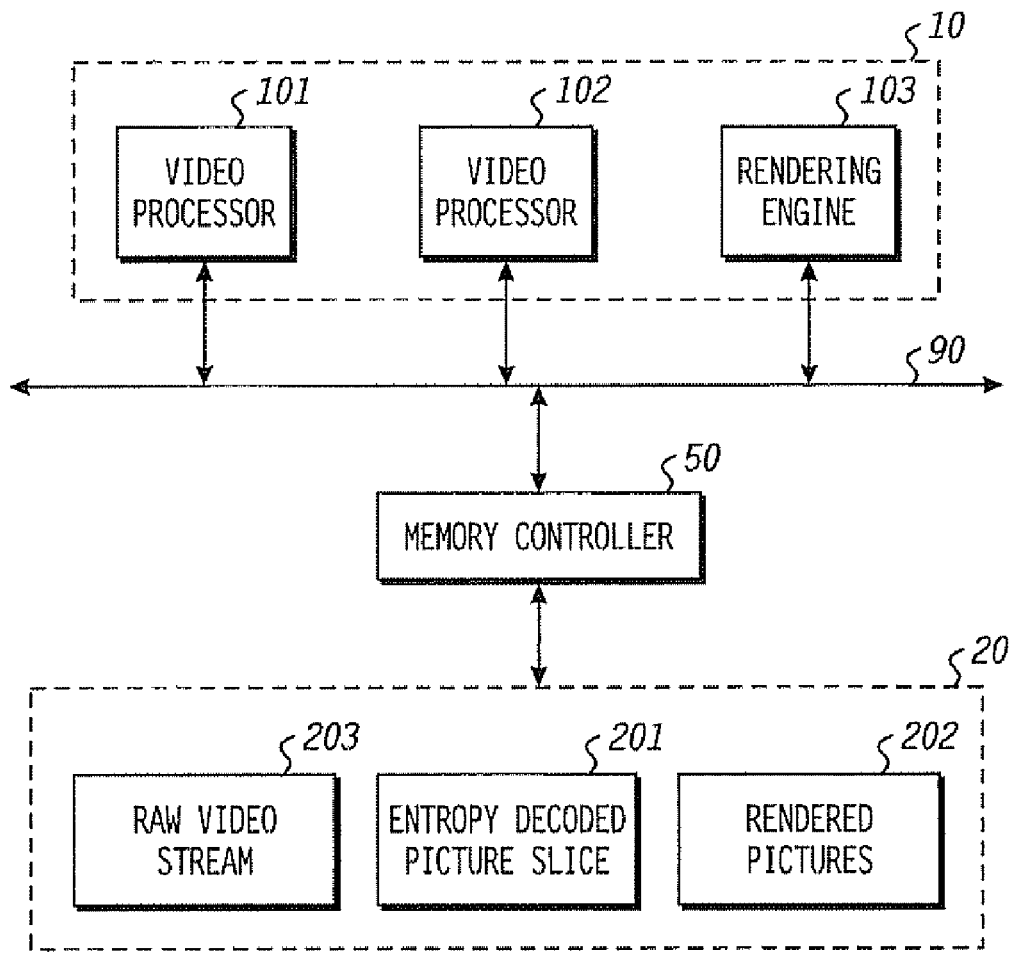
FIG. 3 illustrates a functional block diagram illustrating the video processing system of FIG. 1 in greater detail in accordance with a specific embodiment of the present disclosure.

FIG. 2 illustrates a flow diagram representing a method in accordance with a specific embodiment of the present disclosure. At block 11 of the flow diagram, an encoded digital picture that includes a plurality of picture slices is received. For example, the encoded digital picture can be raw video data, such as an elementary stream, that includes an encoded digital picture that has been encoded in accordance with a specific video standard that supports arbitrary slice ordering. The temporal order that picture slices of the encoded digital picture is received at the video processing system of FIG. 1 is, referred to as the receive order. The receive order can be different than the render order of the picture slices.

The term "encoded digital picture" is intended to refer to digital information that represents a two-dimensional picture that can be decoded to form a rendered digital picture. The term "rendered digital picture" is intended to refer to a digital representation of a two-dimensional image having digital information representing pixels individually that can be rendered by a rendering device for display without further digital decoding. Also, each individual digital pixel of a rendered digital image is represented individually by a corresponding set of digital information that is mutually exclusive of digital information used to represent any other individual digital pixel of the rendered digital image.

For example, the received VIDEO STREAM received at MPE 10 represents a picture in an encoded format as opposed to a renderable format, and therefore is referred to as an encoded digital picture. However, once encoded digital information is sufficiently decoded to where it is in a renderable format that represents digital pixels individually, such that they can be rendered by a rendering engine, the information is referred to as a rendered digital picture. It will be appreciated that a rendered digital picture may need further video processing to improve the quality of the rendered digital picture it represents. For example, video decode processing may generate an unfiltered rendered digital picture that still needs further processing, such as filtering, to remove undesirable visual artifacts.

The VIDEO STREAM received at video processor 101 is received from a video source. Receiving the VIDEO STREAM from a video source can include retrieving the VIDEO STREAM from memory 20. For example, referring to FIG. 3, a more detailed implementation of the interconnects 901-904 is illustrated to include a memory control module 50 and an interconnect 90. For purposes of discussion, interconnect 90 is considered to be a bus structure including a plurality of conductive nodes through which the various modules of MPE 10 can provide requests to memory control module 50 to access information, such as information at memory 20.

Because various video standards supported by the video processor of FIG. 1 allow arbitrary picture slice ordering, and discontinuous macroblocks within each picture slice, the receive order of a plurality of picture slices of an encoded picture within the VIDEO STREAM can be different than their render order. For example, referring to FIG. 4, the picture slice partitioning of a picture represented by a macroblock array of size 22×18 is illustrated. The picture represented by the macroblock array of FIG. 4 has been encoded to have a set of picture slices labeled S1-S7. Each picture slice includes the macroblocks surrounded by its corresponding bold borders. Note that the numeric suffix of each picture slice label indicates the relative render order of the picture slice, as determined by the render order of the picture slices' the top-left macroblock. For example, picture slice S3 includes macroblocks that will be rendered before and after the macroblocks of picture slice S4, however, since the top-left macroblock of picture slice S3, MB[1,3] is rendered before the top-left macroblock of picture slice S4, MB[7,4], the picture slice S3 has a render order that is prior to the render order of picture slice S4. Note that the macroblocks of FIG. 4 can be referred to individually using their corresponding row and column location, such as MB[1,1], or by using their render order, such as MB1. For example, the references MB[1,1] and MB0 refer to the same macroblock, references MB[2,1] and MB1 refer to the same macroblock, and references MB[22, 18] and MB395 refer to the same macroblock.

Figure 4:
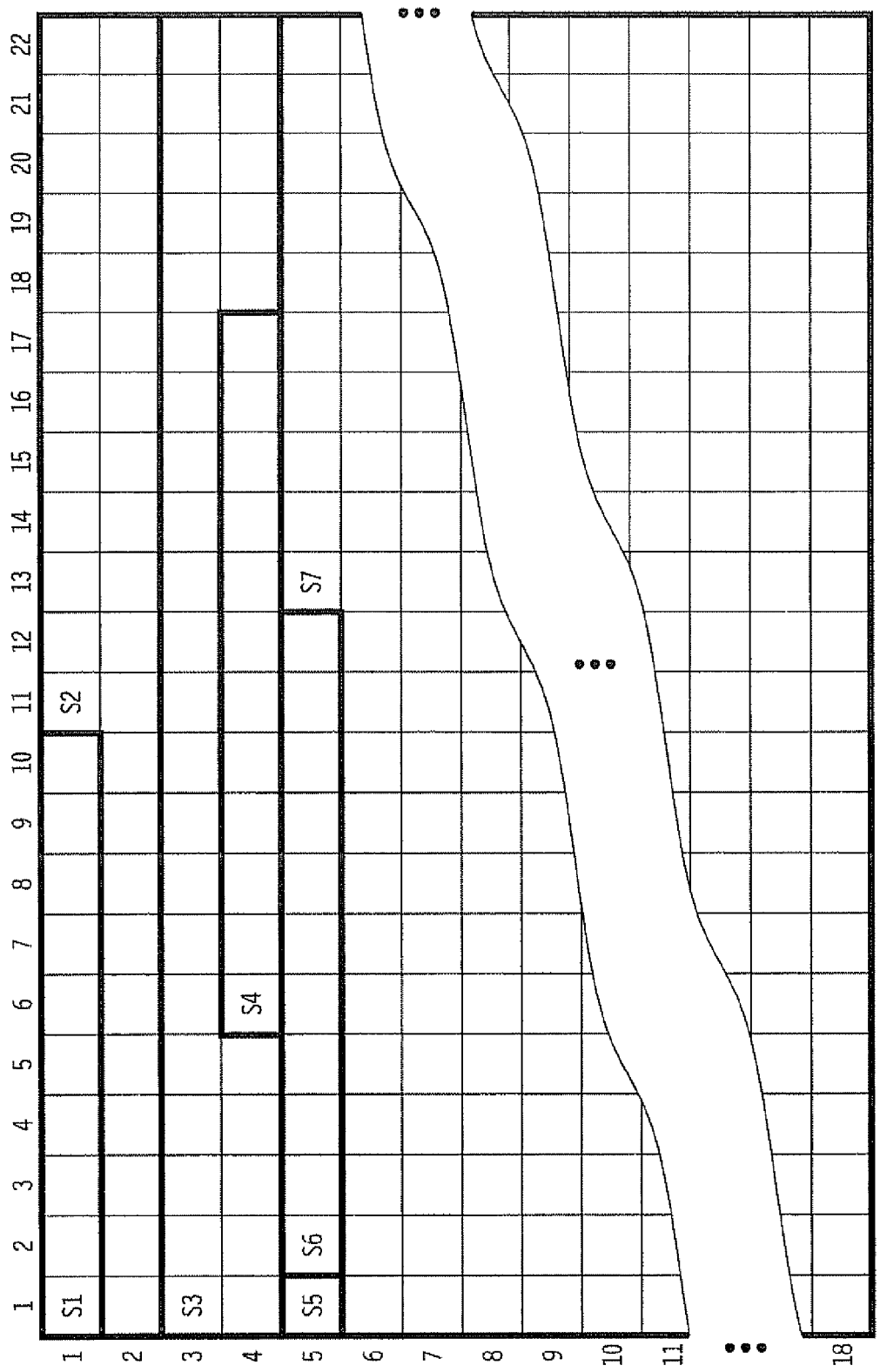
FIGS. 4 and 5 illustrate a macroblock array having picture slices in accordance with a specific example.
Figure 5:
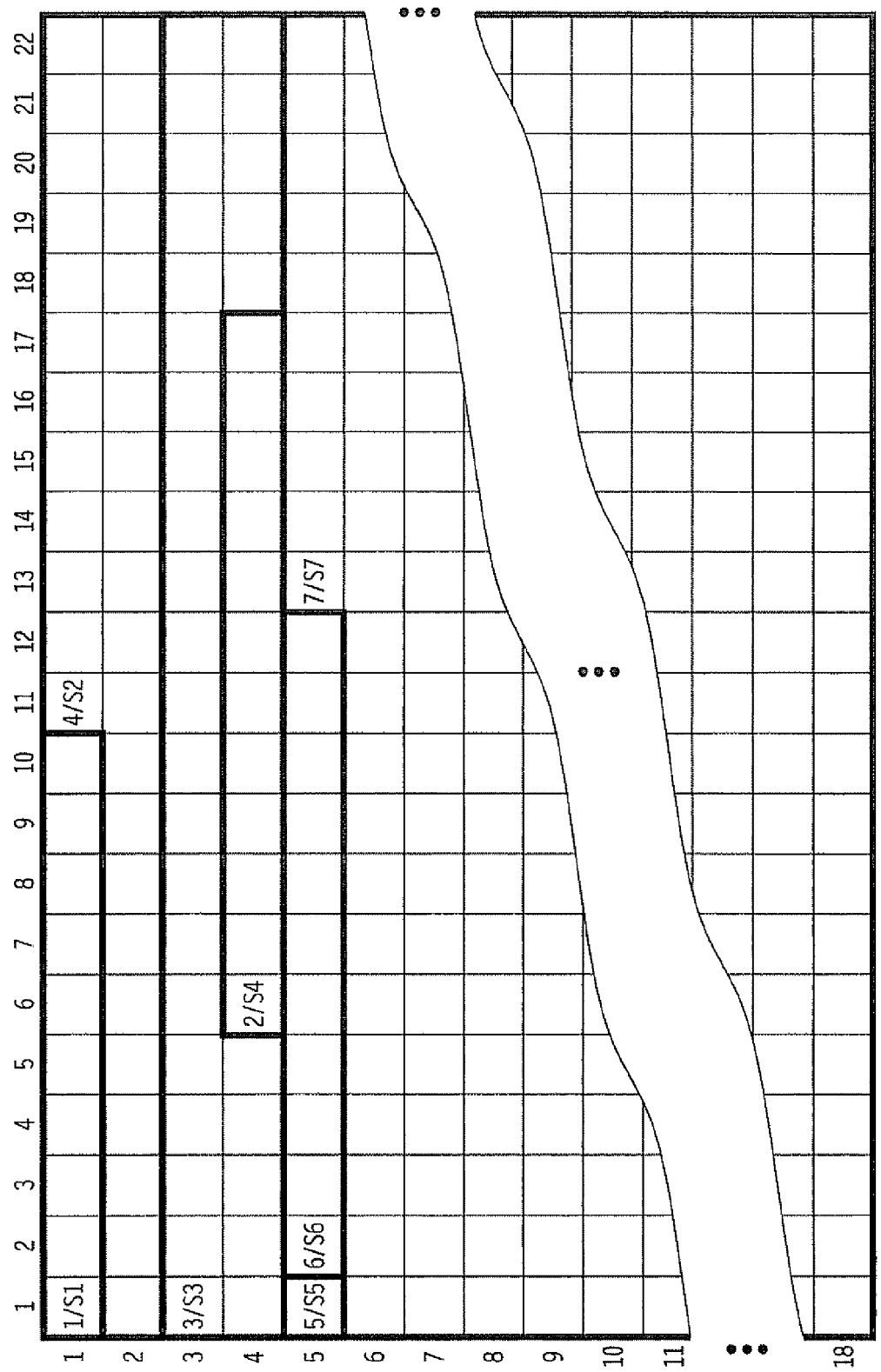
Figure 6:
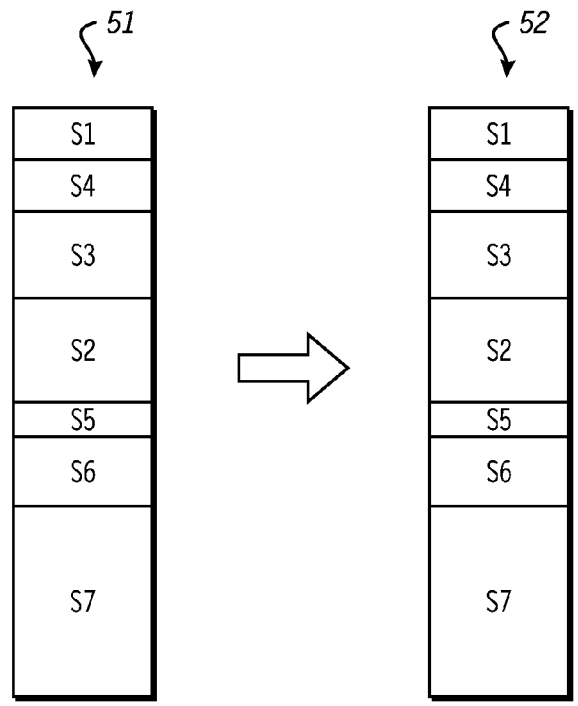
FIG. 6 illustrates a block diagram representing encoded digital pictures in accordance with a specific example.

It will be appreciated that the encoding of the picture corresponding to the macroblock array of FIG. 4 forms an encoded digital image, and the subsequent transmission and receipt of the generated encoded digital image within the VIDEO STREAM of FIG. 1, results in an ordering of the picture slices S1-S7 that can be different from the render order of the picture. For purposes of discussion, it is assumed that receive order of the picture slices of the encoded digital picture at the video processor 101 is as follows: S1, S4, S3, S2, S5, S6, and S7. The receive order of each picture slice is graphically illustrated at the macroblock array of FIG. 5, where the receive order is indicated by a prefix to each picture slice label. For example, slice S2 is labeled 4/S2, to indicated that while slice S2 is the second slice in rendering order, it the forth received slice of the receive order. FIG. 6 illustrates a block diagram representing the encoded digital picture that corresponds to the picture represented by the macroblock array of FIG. 5 as received at video processor 101. Picture slices illustrated nearer the top of the encoded digital picture 51 were received earlier than picture slices illustrated nearer the bottom.

Figure 7:
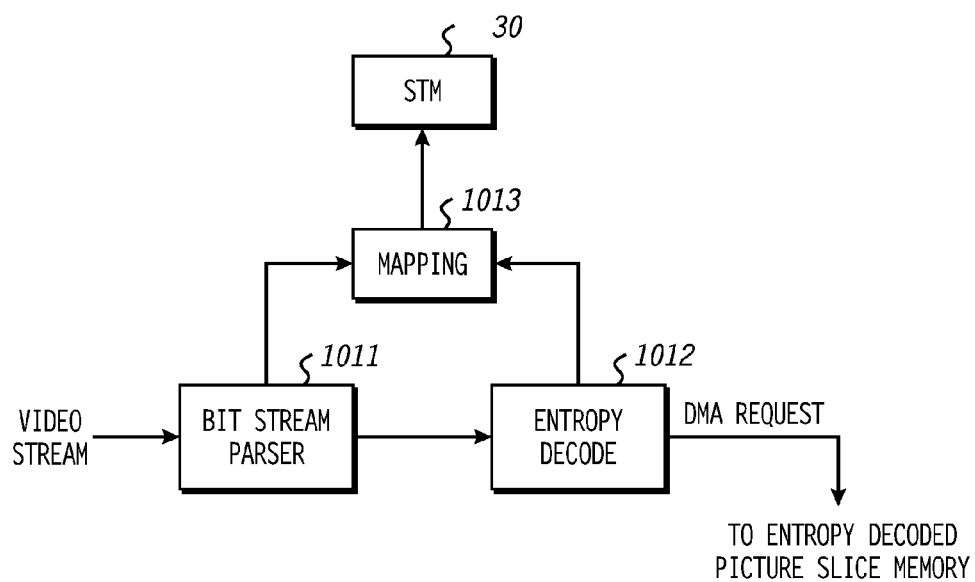
FIG. 7 illustrates a functional block diagram illustrating a video processor of FIG. 1 in greater detail in accordance with a specific embodiment of the present disclosure.

Referring back to the flow diagram of FIG. 2, after the encoded digital picture is received at video processor 101, flow proceeds to block 12. At block 12, the picture slices of the encoded digital picture 51 are processed by the video processor 101 in the order they were received to generate encoded digital picture 52 of FIG. 6. Encoded digital picture 52 is therefore partially decoded. In one embodiment, video processor 101 includes a bit stream parser module 1011 and an entropy decoder module 1012 as illustrated in FIG. 7 that perform decode operations. The output from video processor 101 is the encoded digital picture 52. The encoded digital picture 52 includes a plurality of picture slices that correspond to the plurality of picture slices of the encoded digital picture 51. Processing of picture slices of the encoded digital picture 51 is performed receive order, resulting in the picture slices of encoded digital picture 52 being generated in the receive order.

At block 13 of the flow diagram of FIG. 2, the picture slices of the encoded digital picture 52 are stored sequentially at a picture buffer of memory 20 based upon the receive order. For example, the picture slices processed by the video processor 101, as previously discussed at block 12, are stored at picture buffer 2011 in the portion 201 of memory 20. The picture slices can be stored as a result of a DMA request to memory control module 50 of FIG. 3, whereby as portions of encoded digital picture 52 become available at video processor 101 as they are stored at memory 20. Note that the amount of digital data needed to represent the encoded digital picture 52 will typically differ from the amount of digital data needed to represent the encoded digital picture 51.

Figure 8:
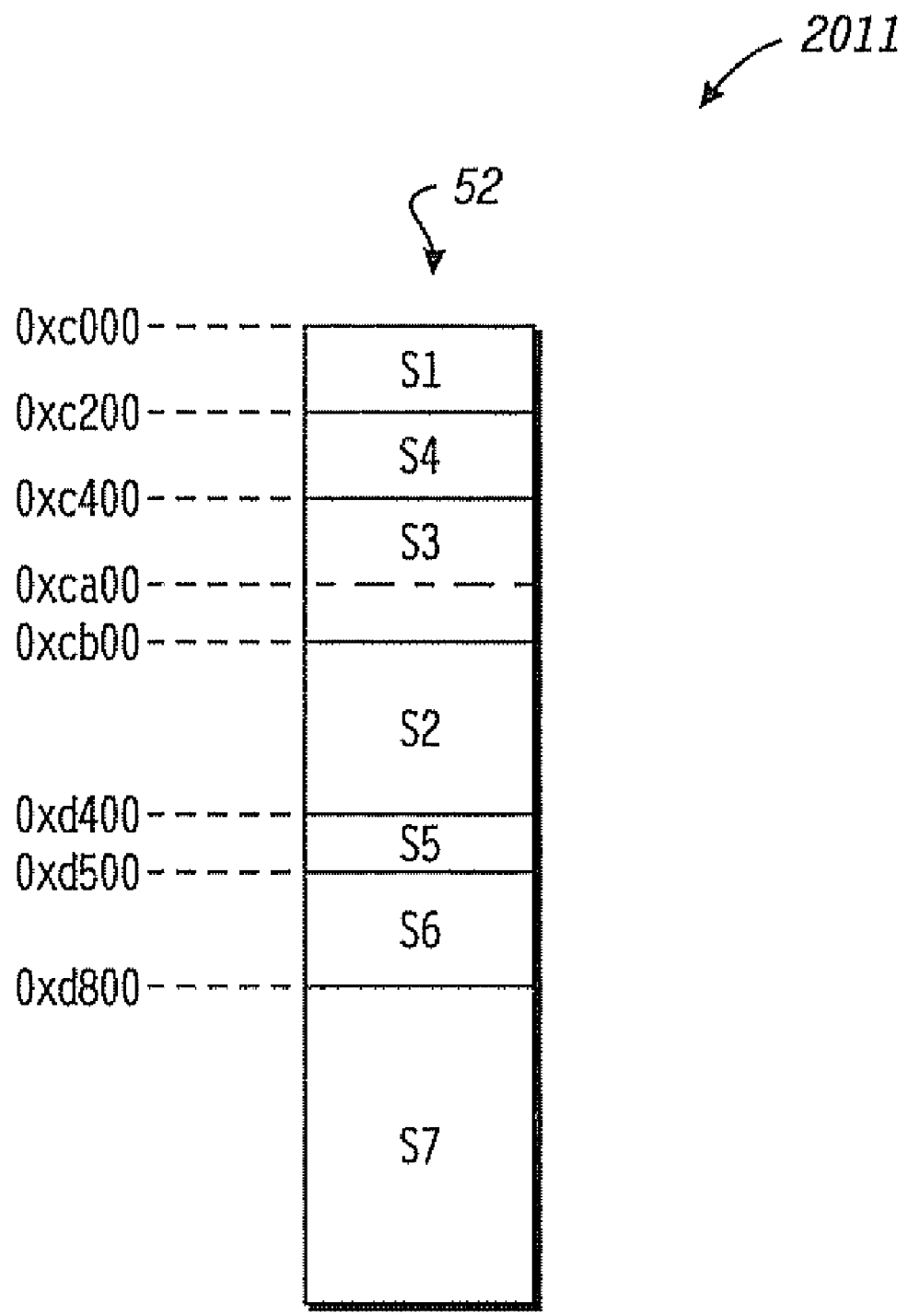
FIG. 8 illustrates a portion of memory 20 of FIG. 1 in accordance with a specific embodiment of the present disclosure.

FIG. 8 illustrates the picture slices of encoded digital picture 52 stored at buffer 2011. For example, the picture slice S1 is stored in the buffer 2011 beginning at offset 0xc000, and immediately before picture slice S4. The picture slice S4 is stored in the buffer 2011 beginning at offset 0xc200, and immediately before picture slice S3. The picture slice S3 is stored in the buffer 2011 beginning at offset 0xc400, and immediately before picture slice S2. The picture slice S2 is stored in the buffer 2011 beginning at offset 0xcb00, and immediately before picture slice S5. The picture slice S5 is stored in the buffer 2011 beginning at offset 0xd400, and immediately before picture slice S6. The picture slice S6 is stored in the buffer 2011 beginning at offset 0xd500, and immediately before picture slice S7. The picture slice S7 is stored in the buffer 2011 beginning at offset 0xd800. Note that the macroblocks of picture slice S3 are discontinuous, relative to their raster order, because of intervening picture slice S4, as illustrated at FIG. 4. The dashed line at offset 0xca00 indicates the offset location of buffer 2011 where the discontinuous portion of picture slice S3 is stored.

At block 14 of FIG. 2, a corresponding size of each picture slice of encoded digital picture 52 as stored at memory buffer 2011 is determined. In one embodiment, the video processor 101 determines the size, e.g., the number of words, of a picture slice of encoded digital picture 52 by determining the number of words of each macroblock of the picture slice. For example, the size can be determined by entropy decode module 1012 as a macroblock's information is written from video processor 101 to memory 20. Summing the size of each macroblock of a picture slice provides the total number of words used to represent the picture slice. The purpose of determining picture slice size information will be described below.

At block 15, information for each picture slice of the encoded digital picture 52 is written to picture slice map table memory 30. It will be appreciated that each encoded digital picture stored at memory portion 101 of memory 20 is represented by a corresponding set of information stored in the picture slice map table memory 30. Information stored at picture slice map table memory 30 for an individual picture slice includes: an indicator of the start location of the picture slice in the memory buffer; an indicator of the end location of the picture slice information in the memory buffer; and an indicator of the location of information related to the next picture slice of the encoded digital picture in the picture slice map table memory 30.

FIG. 9 illustrates a table, referred to as a picture slice table, representing the information stored at picture slice map table memory 30 in response to video processor 101 generating and storing encoded digital picture 52 at buffer 1011. The picture slice table includes a record, e.g., a row, for each macroblock of encoded digital picture 52. Therefore, the table of FIG. 9 has 396 records based upon the 22×18 array macroblocks of encoded digital picture 52. The first column of the table of FIG. 9 lists record identifiers 0-395, each respective record corresponds to one of the 396 macroblocks of encoded digital picture 52 such that there is a one-to-one correspondence. For example, record 0 corresponds to MB0, record 1 corresponds to MB1.

Each record of the picture slice table is offset in picture slice map table memory 30 from the previous record by a known amount, such as 0x10. The second column of the table of FIG. 9 indicates the size of each picture slice, or discontinuous portion of a picture slice, e.g., the number of words of the picture slice at buffer 2011. The fourth column of the table of FIG. 8 indicates an offset location within the buffer 2011 that indicates where the picture slice associated with the record is stored. Note that the location in memory 20 where a picture slice ends can be determined based on its storing location, e.g., the information at the fourth column, and its size. The fourth third column of FIG. 8 indicates a macroblock skip length indicating the number of records of the table of FIG. 9 that need to be skipped skip to locate the record having information related to the next picture slice, or discontinuous picture slice portions, of the picture. The picture slice map of FIG. 9 will be better understood with reference to FIG. 10.

Figure 10:
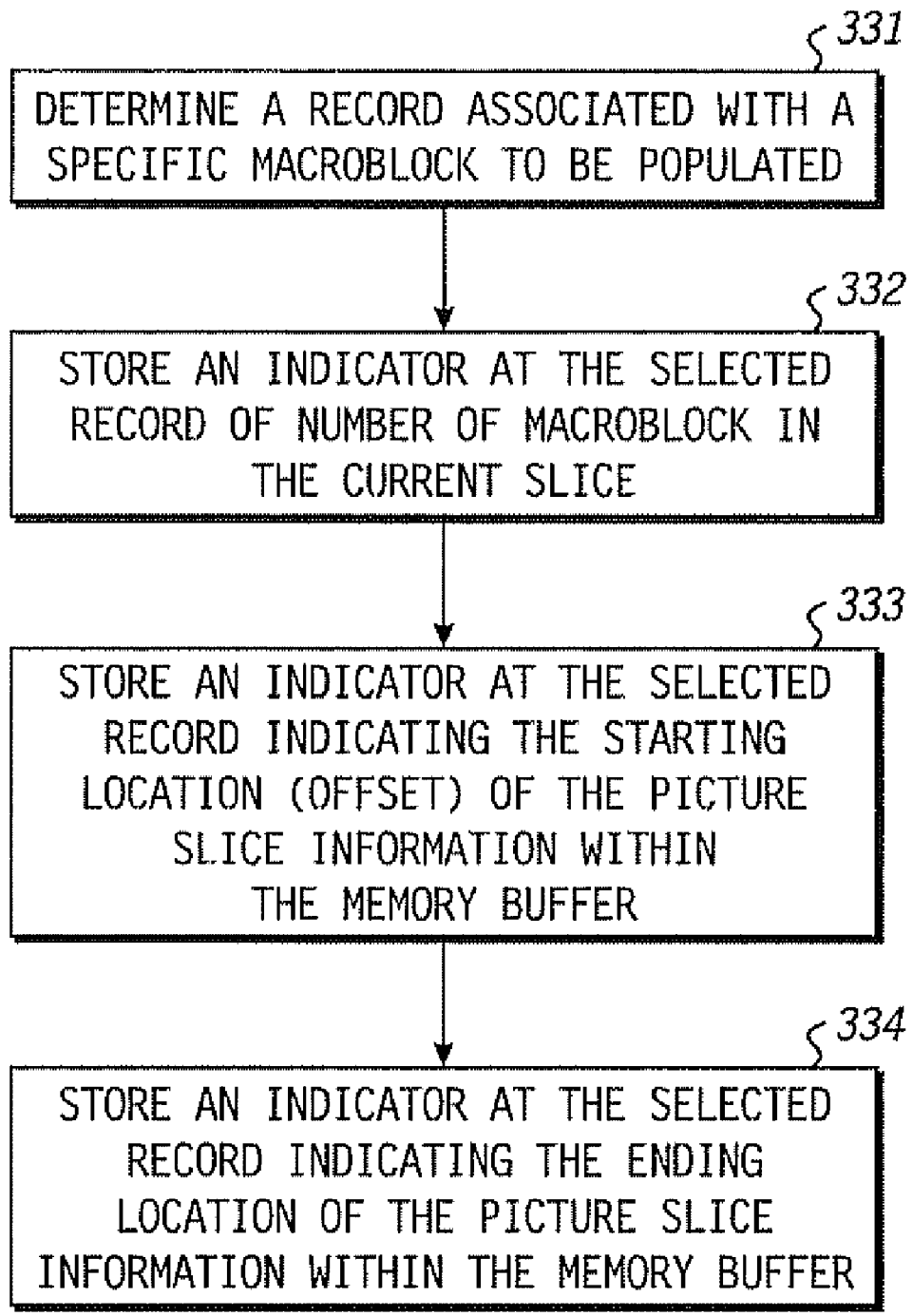
FIG. 10 illustrates a flow diagram representing a method in accordance with a specific embodiment of the present disclosure.

FIG. 10 illustrates a flow diagram representing a method in accordance with a specific embodiment of the present disclosure that is applied to each picture slice of an encoded digital picture to store relevant information that will subsequently be used by video processor 102 to access the picture slice information stored at memory 20 by render order.

At block 331, a determination is made as to which record of the table of FIG. 9 is to be populated. Note that only records corresponding to the first macroblock of a picture slice or a discontinuous portion of a picture slice are to be populated with picture slice information for any given picture map. Therefore, with respect to encoded digital picture 52, only eight records of the picture slice table of FIG. 9 will be populated. The mapping module 1013 receives information from bit stream parser 1011 and determines the partitioning of encoded digital picture 52, and controls where picture slice information is stored at picture slice map table memory 30 based of this information. Since picture slice 51 starts at macroblock MB1, the row the having the macroblock indicator 1, which corresponds to macroblock MB1, is selected and populated by the mapping module 1013 as indicated herein.

At block 332, an indicator based upon the number of macroblocks in the current picture slice is stored at the record identified at block 331. This value is determined by the mapping module 1013 based on information from bit stream parser 1011 during parsing. In one embodiment, the value stored at the table of FIG. 9 is one less than the total number of macroblocks in the current picture slice, so that when multiplied by the size of each record an offset to the next record representing a picture slice is determined. Since the number of macroblocks within S1, is 10, a value of 9 is stored at the column labeled MACROBLOCK SKIP LENGTH.

At block 333, an indicator is stored at the selected record of table 9 that indicates the starting location of the picture slice information within the memory buffer. This information is provided by the management module 1013 based upon information received from entropy decode module 1012 relating to storing information at memory 20. For example, entropy decode module 1012 receives the beginning buffer location from memory control module 50 during a store operation during which each picture slice is stored. Based upon the information of FIG. 8, a value of 0xc000 was returned to the MPE10 during the store operation and stored at the column labeled PICTURE SLICE OFFSET.

At block 334, an indicator is stored at the selected record indicating the ending location of the picture slice information within the memory buffer. It will be appreciated that the picture slice size that was calculated earlier by the management module 1013 is an indicator of where information associated with a picture slice ends. Therefore, the size of picture slice S1 is stored at the column labeled PICTURE SLICE LENGTH. The size can indicate a number of words.

The next received picture slice from the encoded digital picture 52 is picture slice S4. Since picture slice S4 starts at macroblock MB72, the row the having a macroblock indicator of 72, which corresponds to macroblock MB72, is selected. Since the number of macroblocks within S4, is 11, a value of 10 is stored at the column labeled MACROBLOCK SKIP LENGTH of the selected record. Based upon the information at FIG. 8, a value of 0xc200 is stored at the column labeled PICTURE SLICE OFFSET of the current record. A size of 0x200 for picture slice S4 has been stored at the column labeled PICTURE SLICE OFFSET of the current record.

The next received picture slice from the encoded digital picture 52 is picture slice S3. However, picture slice S3 includes two discontinuous sets of macroblocks. The first discontinuous set of macroblocks starts at macroblock MB44 and ends with MB71. The second discontinuous set of macroblocks starts at macroblock MB83 and ends with MB87. Each discontinuous set of macroblocks is represented by a separate record at the table of FIG. 9, in order to facilitate their being accessible in render order. Since the first discontinuous portion of picture slice S3 starts at macroblock MB44, the row the having a macroblock indicator of 44, which corresponds to macroblock MB44 is selected. Since the number of macroblocks within the first discontinuous portion of is 28, a value of 27 is stored at the column labeled MACROBLOCK SKIP LENGTH. Based upon the information at FIG. 8, a value of 0xc400 is stored at the column labeled PICTURE SLICE OFFSET. A size of 0x600 for the second discontinuous portion of picture slice S3 has been stored at the column labeled PICTURE SLICE LENGTH.

Since the second discontinuous portion of slice S3 starts at macroblock MB83, the row the having a macroblock indicator of 83, which corresponds to macroblock MB38 is selected. Since the number of macroblocks within the second discontinuous portion of S3 is 5, a value of 4 is stored at the column labeled MACROBLOCK SKIP LENGTH. Based upon the information of FIG. 8, a value of 0xca00 is stored at the column labeled PICTURE SLICE OFFSET. A size of 0x100 for the second discontinuous portion of picture slice S3 has been stored at the column labeled PICTURE SLICE LENGTH.

The next received picture slice from the picture of FIG. 4 is picture slice S2. Since picture slice S2 starts at macroblock MB44, the row the having a macroblock indicator of 44, which corresponds to macroblock MB4 is selected. Since the number of macroblocks within S2 is 28, a value of 27 is stored at the column labeled MACROBLOCK SKIP LENGTH. Based upon the information of FIG. 8, a value of 0xc400 is stored at the column labeled PICTURE SLICE OFFSET. A size of 0x600 for picture slice S2 has been stored at the column labeled PICTURE SLICE LENGTH.

The next received picture slice from the encoded digital picture 52 is picture slice S5. Since picture slice S5 starts at macroblock MB88, the row the having a macroblock indicator of 88, which corresponds to macroblock MB88 is selected. Since the number of macroblocks within S5 is 1, a value of 0 is stored at the column labeled MACROBLOCK SKIP LENGTH. Based upon the information of FIG. 8, a value of 0xd400 is stored at the column labeled PICTURE SLICE OFFSET. A size of –0x100 for picture slice S5 has been stored at the column labeled PICTURE SLICE LENGTH.

Similarly, the records corresponding to macroblock MB89 and MB100 are populated as indicated at FIG. 9.

The generated picture map table as illustrated FIG. 9, therefore, includes information that indicates the render order of the received picture slices. In addition, the picture slices of encoded digital picture 52 can be accessed in any order, including render order, based upon the information stored at the picture slice map table illustrated at FIG. 10.

Referring back to the flow diagram of FIG. 2, at block 16, the plurality of picture slices of encoded digital picture 52 stored at the picture buffer 2011 are retrieved in render order by video processor 102 for processing. At block 17, the retrieved information is processed in render order, since the picture slice information is retrieved in render order by the video processor 102. Therefore, the video processor 102 can include a filter block portion that can access picture information across all picture slice and macroblock boundaries during filtering.

Referring to FIG. 1, rendered pictures are stored at memory portion 202 where picture buffers 2021, 2022, and 2023 reside. The rendering engine 103 can render an image at display device 40 by accessing rendered digital picture from memory portion 202.

In accordance with a first aspect of the present disclosure, a first plurality of picture slices is processed in a first order to obtain a second plurality of picture slices based upon the first plurality of picture slices, where the first order is different than a render order of a picture represented by the first and second encoded digital images. The second plurality of picture slices are stored at a first memory buffer in response to being processed, where each picture slice of the second plurality of picture slices is stored at a corresponding offset of the first memory buffer. A corresponding size is determined for each picture slice of the second plurality of picture slices. Corresponding information is stored in a memory table for each picture slice of the plurality of picture slices indicating a start location of the picture slice, an end location of the calico and an index to a next picture slice in the memory table. The second plurality of picture slices are processed in the render order to obtain a rendered digital image of the picture.

In an implementation indicating the end location includes indicating a size of the corresponding picture slice. In another implementation storing the second plurality of picture slices at the first memory includes storing coefficient data of the picture slice separately from motion vector prediction data of the picture slice. In another implementation storing the second plurality of picture slices includes storing coefficient data of the picture slice separately from motion vector prediction data. In another implementation the memory table includes a plurality of records, one record for each corresponding macroblock of the picture, wherein information for each picture slice of the plurality of picture slices is stored at a corresponding one of the records of the plurality of records. In another implementation the memory table includes a plurality of records, one record for each corresponding macroblock of the picture, wherein the corresponding one of them is selected to correspond to the first macroblock within the picture slice.

Note that not all of the activities described above in the general description or the examples are required, that a portion of a specific activity may not be required, and that one or more further activities may be performed in addition to those described. Still further, the order in which activities are listed are not necessarily the order in which they are performed.

After reading this specification, skilled artisans will be capable of determining what activities can be used for their specific needs or desires.

In the foregoing specification, principles of the invention have been described above in connection with specific embodiments. However, one of ordinary skill in the art appreciates that one or more modifications or one or more other changes can be made to any one or more of the embodiments without departing from the scope of the invention as set forth in the claims below. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof have been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

What is claimed is:

1. A method of processing video data comprising:
   processing, in a first order, a first plurality of picture slices of a first encoded digital picture to obtain a second plurality of picture slices, wherein the first order is different than a render order of a picture represented by the first encoded digital picture;
   storing the second plurality of picture slices at a first memory buffer, wherein each picture slice of the second plurality of picture slices is stored at a corresponding offset of the first memory buffer;
   storing corresponding information in a memory table for each picture slice of the second plurality of picture slices, the information indicating a start location of the picture slice at the first memory buffer, an end location of the picture slice at the first memory buffer, and an index to a location of the memory table comprising information for a next picture slice, wherein the memory table includes a plurality of records, and wherein information from discontinuous macroblocks in respective slices in the second plurality of picture slices is represented by separate records in the memory table; and
   processing, in the render order, the second plurality of picture slices to obtain a rendered digital picture of the picture.

2. The method of claim 1, further comprising:
   determining a corresponding size of each picture slice of the second plurality of picture slices, wherein the information indicating the end location includes information indicating a size of the corresponding picture slice.

3. The method of claim 1, wherein each record in the plurality of records corresponds to a corresponding macroblock of the picture.

4. The method of claim 3, wherein information for each picture slice of the second plurality of picture slices is stored at a corresponding one of the records of the plurality of records.

5. The method of claim 1, further comprising receiving the first plurality of picture slices in the first order.

6. The method of claim 1, wherein processing in the render order includes filtering across boundaries of the picture slices of the second plurality of picture slices.

7. The method of claim 1, wherein the render order is based upon the information stored at the memory table.

8. The method of claim 1, wherein storing corresponding information in the memory table for each picture slice of the second plurality of picture slices further comprises:
for each picture slice having discontinuous macroblocks, storing the start location at a first record of the memory table, and storing the end location and the index at a second record of the memory table, wherein the first record is associated with a first discontinuous portion of the picture slice, and wherein the second record is associated with a second discontinuous portion of the picture slice.

9. The method of claim 8, further comprising: for each picture slice that includes discontinuous macro blocks, storing a start location of a second portion of the picture slice at the second record, storing an index to the second record at the first record, and storing an end location of a first portion of the picture slice at the first memory buffer at the second record.

10. The method of claim 8, wherein storing corresponding information in the memory table for each picture slice of the second plurality of picture slices further comprises:
for each picture slice having only continuous macro blocks, storing the start location, the end location, and the index location at first record of the memory table.

11. The method of claim 1, wherein storing corresponding information in the memory table for each picture slice of the second plurality of picture slices further comprises:
for each picture slice having only continuous macro blocks, storing the start location, the end location, and the index location at a first record of the memory table; and
wherein processing in the rendering order includes determining a next frame slice to be processed by determining a next record associated with the next picture slice of the second plurality of picture slices, the next record determined based upon the index stored at the current record and a location of a current record.

12. The method of claim 11, wherein the plurality of records includes the first record, and wherein a number of records in the plurality of records is equal to a number of macro blocks in the picture.

13. A device comprising:
a memory;
a picture slice table;
a first video decode module coupled to the memory, wherein the first video decode module is configured to:
receive, in a first order, a first plurality of picture slices of a first encoded digital picture, wherein the first order is different than a render order of a picture represented by the first plurality of picture slices, and
generate and store, in the first order, a second plurality of picture slices based on the first plurality of picture slices at a first buffer of the memory; and
a mapping module coupled to the picture slice table and to the first video decode module, wherein the mapping module is configured to store record information at the picture slice table for each picture slice of the second plurality of picture slices stored at the first buffer, the record information for each picture slice including:
a corresponding size of the picture slice at the first buffer,
a start location of the picture slice at the first buffer,
an end location of the picture slice at the first buffer, and
an index to a next record of the picture slice table for a different picture slice of the second plurality of picture slices, wherein the picture slice table includes a plurality of records, and wherein information from discontinuous macroblocks in respective slices in the second plurality of picture slices is represented by separate records in the picture slice table.

14. The device of claim 13, further comprising:
a second video decode module coupled to the memory, wherein the second video decode module is configured to:
receive, based on the record information, the second plurality of picture slices from the first buffer in the render order, and
generate and store a third plurality of picture slices based on the second plurality of picture slices at a second buffer of the memory and the record information.

15. The device of claim 14, wherein the second video decode module is a filter module for filtering picture information based upon the second plurality of picture slices.

16. The device of claim 14, wherein the second video decode module is configured to filter the picture information across boundaries of the second plurality of picture slices.

17. A method for processing video data, the method comprising:
receiving, using a processing device; a plurality of first picture slices in a receive order;
generating, using the processing device and based on the first picture slices, an encoded digital picture by processing the picture slices in the receive order, wherein the encoded digital picture comprises a plurality of second picture slices;
storing, using the processing device, the second picture slices in a memory buffer, wherein respective picture slices in the second picture slices are stored at corresponding offsets in the memory buffer;
determining, using the processing device, a corresponding size of respective slices of the second picture slices;
storing, using the processing device, information in a memory table regarding respective slices in the second picture slices, wherein the information includes a start location for respective slices in the second picture slices, an end location for respective slices in the second picture slices, and an location in memory of a next slice, wherein the memory table includes a plurality of records, and wherein information from discontinuous macroblocks in respective slices in the second picture slices is represented by separate records in the memory table;
retrieving, using the processing device, the second picture slices in a render order; and
generating, using the processing device and based on the stored information, a rendered digital image by processing the second picture slices in the render order.

18. The method of claim 17, wherein each record corresponds to a macroblock.

19. The method of claim 17, wherein storing the information regarding respective slices in the second picture slices further comprises:
determining a record to be populated in the plurality of records;
storing a first indicator at the determined record, wherein the first indicator indicates a number of macroblocks of a first picture slice corresponding to the record;
storing a second indicator at the determined record, wherein the second indicator indicates a first start location for first picture slice information stored in the memory buffer; and
storing a third indicator at the selected record, wherein the third indicator indicates a first end location for the first picture slice information stored in the memory buffer.

20. The method of claim 17, further comprising:
detecting that a picture slice includes a discontinuous set of macroblocks by determining that macroblocks of the picture slice are discontinuous respective to their raster order.

* * * * *